United States Patent
Caldarone et al.

(10) Patent No.: US 9,720,578 B1
(45) Date of Patent: *Aug. 1, 2017

(54) SYSTEM AND METHOD FOR FACILITATING USER INTERACTION WITH A VIRTUAL SPACE THROUGH A GRAPHICAL CHAT INTERFACE

(71) Applicant: KABAM, INC., San Francisco, CA (US)

(72) Inventors: Michael C. Caldarone, Palo Alto, CA (US); Kellen Christopher Smalley, Dublin, CA (US); Matthew Curtis, Novato, CA (US); James Koh, Mountain View, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/072,223

(22) Filed: Mar. 16, 2016

Related U.S. Application Data

(63) Continuation of application No. 13/862,046, filed on Apr. 12, 2013, now Pat. No. 9,332,043.

(51) Int. Cl.
*G06F 3/048* (2013.01)
*G06F 3/0484* (2013.01)
*G06F 3/0481* (2013.01)
*H04L 12/58* (2006.01)

(52) U.S. Cl.
CPC ........ *G06F 3/0484* (2013.01); *G06F 3/04815* (2013.01); *H04L 51/043* (2013.01)

(58) Field of Classification Search
None
See application file for complete search history.

(56) References Cited

U.S. PATENT DOCUMENTS

| | | |
|---|---|---|
| 5,909,794 A | 6/1999 | Molbak |
| 6,148,328 A | 11/2000 | Cuomo |
| 7,056,217 B1 | 6/2006 | Pelkey |
| 7,194,505 B2 | 3/2007 | Yano |
| 7,325,034 B2 | 1/2008 | Douglis |
| 8,050,987 B2 | 11/2011 | Liu |
| 8,214,344 B2 | 7/2012 | Kruglick |
| 8,255,542 B2 | 8/2012 | Henson |
| 8,396,932 B2 | 3/2013 | Pattekar |

(Continued)

*Primary Examiner* — Tuan S Nguyen
(74) *Attorney, Agent, or Firm* — Sheppard Mullin Richter & Hampton LLP

(57) ABSTRACT

A system and method for facilitating user interactions with a virtual space through a graphical chat interface is disclosed. One or more potential inputs to the virtual space and/or virtual space status information may be determined dynamically for a user participating in a chat session through a graphical chat interface. An activity notification may be generated for the user based one the determined potential inputs and/or the virtual space status information. The generated activity notification may comprise graphical representation for the notification and as well as representation information for one or more controls facilitating the user to provide inputs requested by the activity notification through the graphical chat interface. User acceptance to the activity notification via the graphical chat interface may be received. One or more activity commands may be generated based on the received user acceptance and executed in the virtual space.

18 Claims, 5 Drawing Sheets

(56) References Cited

U.S. PATENT DOCUMENTS

| | | |
|---|---|---|
| 8,543,926 B2 | 9/2013 | Giles |
| 8,588,394 B2 | 11/2013 | Schlesener |
| 8,737,598 B2 | 5/2014 | Bruce |
| 8,984,080 B1 | 3/2015 | Curtis |
| 2003/0037110 A1 | 2/2003 | Yamamoto |
| 2006/0020697 A1 | 1/2006 | Kelso |
| 2008/0201438 A1 | 8/2008 | Mandre |
| 2009/0113452 A1 | 4/2009 | Grigsby |
| 2009/0235182 A1 | 9/2009 | Kagawa |
| 2011/0302509 A1 | 12/2011 | Leacock |
| 2011/0307807 A1 | 12/2011 | Norby |
| 2012/0124147 A1 | 5/2012 | Hamlin |
| 2012/0283011 A1 | 11/2012 | Van Luchene |
| 2012/0283014 A1 | 11/2012 | Van Luchene |
| 2013/0066988 A1 | 3/2013 | Levinson |
| 2013/0198304 A1* | 8/2013 | Jung .................. H04L 12/1818 709/206 |
| 2013/0254304 A1 | 9/2013 | Van Nest |

* cited by examiner

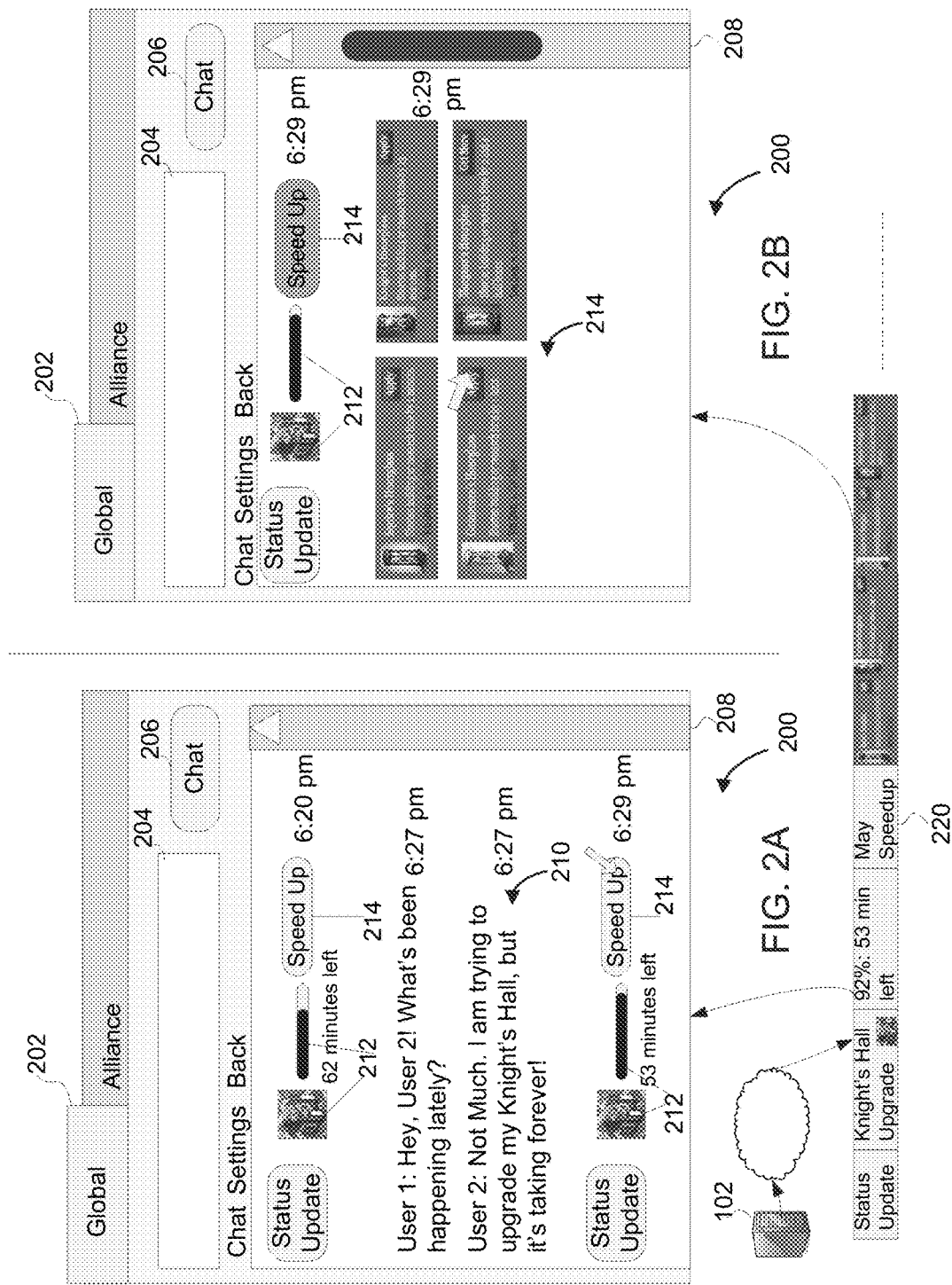

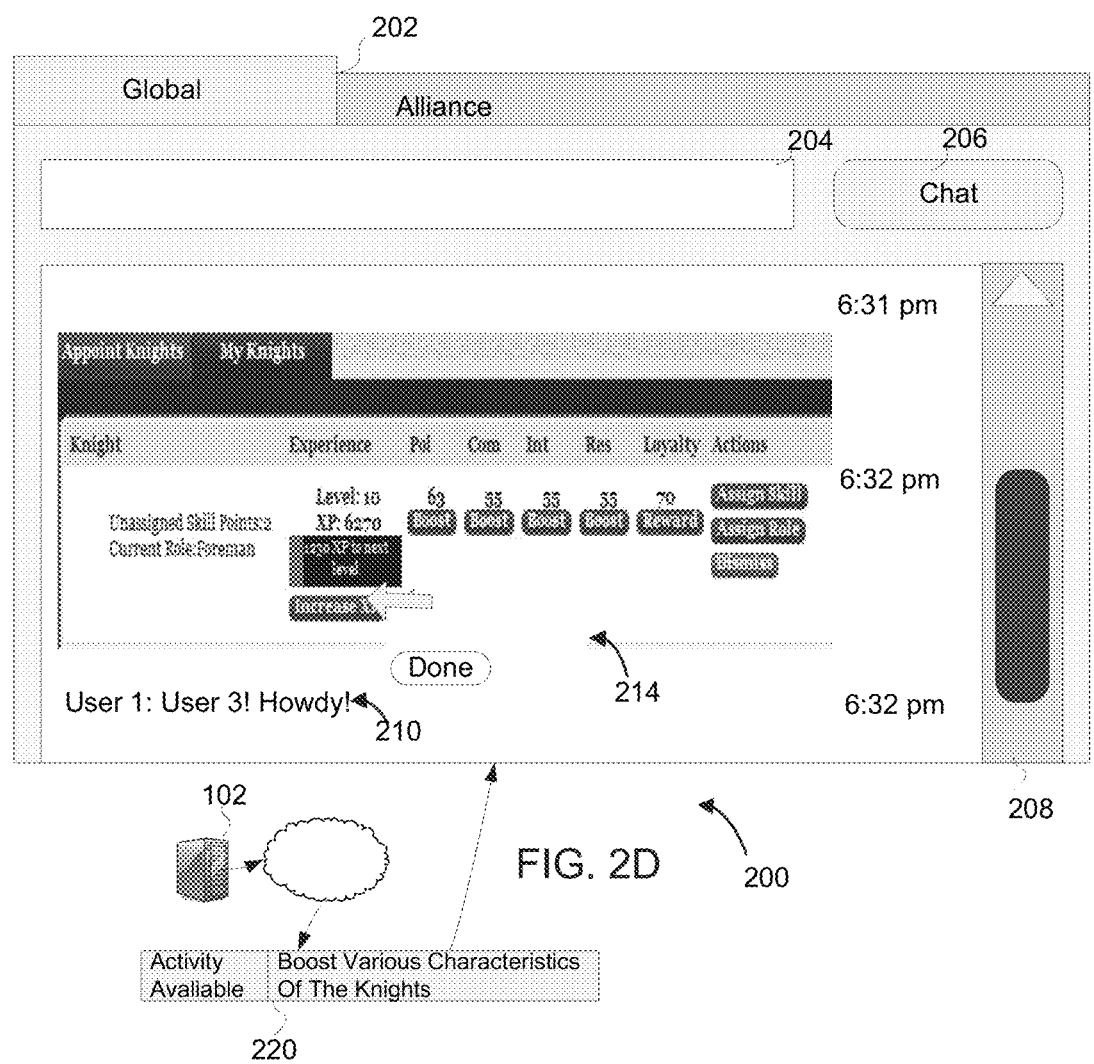

SYSTEM AND METHOD FOR FACILITATING USER INTERACTION WITH A VIRTUAL SPACE THROUGH A GRAPHICAL CHAT INTERFACE

FIELD OF THE DISCLOSURE

This disclosure relates to facilitating user interactions with a virtual space through a graphical chat interface provided by a provider of the virtual space, the user interactions with the virtual space being facilitated by presenting virtual space activity notifications and receiving user inputs to the virtual space through the graphical chat interface.

BACKGROUND

Systems that provide chat within a virtual space are known. In those systems, general status and updates regarding chat rooms are typically provided through a user chat interface. For example, in some of those systems, information regarding arrival, departure, and/or a number of users in a chat room may be presented through the user chat interface. In those systems, information about user status (e.g., browsing internet, playing a game, etc.) may also be presented through the user chat interface. However, in those systems, means to interact with virtual space for initiating user actions within the virtual space are not provided through the user chat interface. Therefore, a user engaging in a chat through the chat interface will have to leave the user chat interface and switch to a virtual space interface in order to interact with the virtual space.

SUMMARY

One aspect of the disclosure relates to facilitating user interactions with a virtual space through a graphical chat interface. Potential inputs to the virtual space and/or virtual space status information may be determined dynamically for a user participating in a chat session through the graphical chat interface. Such a dynamic determination may be made to provide the user, who is engaging in social interactions through the graphical chat interface, opportunities and/or motivations to respond to occurrences of events within the virtual space, to continue activities within the virtual space, to progress in the virtual space, and/or to engage in any other user interactions with the virtual space. An activity notification requesting the potential inputs from the user and/or indicating the virtual space status information may be generated. The activity notification may be graphically presented to the user through the graphical chat interface. The graphically presented activity notification may comprise one or more controls to facilitate the user to provide inputs requested by the activity notification. Upon the user inputs responding to the activity notification via the graphical chat interface, a corresponding activity command may be generated and executed in the virtual space. This may allow the user to interact with the virtual space and still engage in social interactions through the graphical chat interface. This may increase monetization opportunities and/or retention rate for the provider of the virtual space as the user may not be encumbered to interact with the virtual space through a space interface and leave the chat interface as required by the conventional virtual space systems.

In some implementations, a system configured to facilitate user interactions with virtual space through a chat in the virtual space may comprise a server. The server may operate in a client/server architecture with one or more client computing platforms. The client computing platforms may be associated with the users of the virtual space. The server may be configured to execute one or more of a space module, a user-activity module, a chat module, an activity-notification module, a response-request module, and/or other modules.

The space module may be configured to execute an instance of a virtual space. The space module may implement the instance of the virtual space to facilitate user interactions with the virtual space. The user interactions may be facilitated by executing actions within the virtual space. In some examples, the executed user actions may cause state changes within the virtual space.

The chat module may be configured to implement chat sessions to facilitate synchronous textual communications between users. The textual communications may include one or more of textual chat, instant messages, private messages, and/or other textual communications. The textual communications may facilitate the users to share information about the virtual space, engage in social interactions, recruit other users, invite other users to cooperate, and/or engage in any other activities enabled by the textual communications. The chat module may transmit the textual communications for presentation through graphical chat interfaces implemented on client computing platforms.

The user-activity module may be configured to dynamically identify potential inputs to the space module for users who are participating in chat sessions through graphical chat interfaces. The potential inputs may be identified by the user-activity module in order for those users to respond to occurrences of events within the virtual space, to continue activities within the virtual space, to progress in the virtual space, and/or to engage in any other user interactions with the virtual space. The dynamically identified potential inputs may include inputs for the user to, but not limited to, defend and/or attack a virtual space location, march troops, transport troops and/or virtual resources, build constructions, train virtual space entities, research, mine, craft, prospect and/or to engage in any other user interactions with virtual space. In some examples, the potential inputs may involve user specifications of an amount, type of virtual resource and/or items to be consumed within the virtual space in order for the user to continue activities and/or to progress in the virtual space. In some implementations, the user-activity module may be configured to dynamically determine virtual space status information related to such a user. The status information may include information indicating status of the activities engaged by the user in the virtual space, information regarding opportunities and/or motivations provided by the virtual space, and/or any other virtual space status information related to the user. In some implementations, such status information may be determined by the user-activity module in response to occurrences of events related to the user. In some implementations, such status information may be determined at a frequency predetermined by the provider of the virtual space.

Responsive to the identified potential inputs and/or determined status information by the user-activity module for the user participating in the chat session through the graphical chat interface, the activity notification module may be configured to generate an activity notification for presentation in the graphical chat interface to the user. The activity-notification module may be configured to effectuate communication of the generated activity notification for presentation through the graphical chat interface. In some implementations, the generated activity notifications may comprise graphical representation information for the graphically presenting the notification in the graphical chat interface. The graphical representation information may include information for presenting one or more controls that facilitates consumption of virtual resources and/or items by the users through the graphical chat interface.

The response-request module may be configured to receive an user acceptance to the activity notification and to generate one or more activity commands executable by the space module. The received user acceptance may include inputs provided by the user as requested by the activity notification. Responsive to receiving such an user acceptance, the response-request module may generate one or more activity commands executable by the space module to effectuate the user action initiated through the acceptance. This may involve parsing the user acceptance, extracting action parameters from the acceptance, and constructing the one or more activity commands based on the action parameters using predetermined syntax.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2A illustrates one example of facilitating user interactions with a virtual space through a graphical chat interface in accordance with the disclosure.

FIG. 2B illustrates an example of facilitating a user to consume virtual items through a graphical chat interface 200 in accordance with the disclosure.

FIG. 2D illustrates another example of facilitating a user to interact with a virtual space through a graphical chat interface.

DETAILED DESCRIPTION

Figure 1:
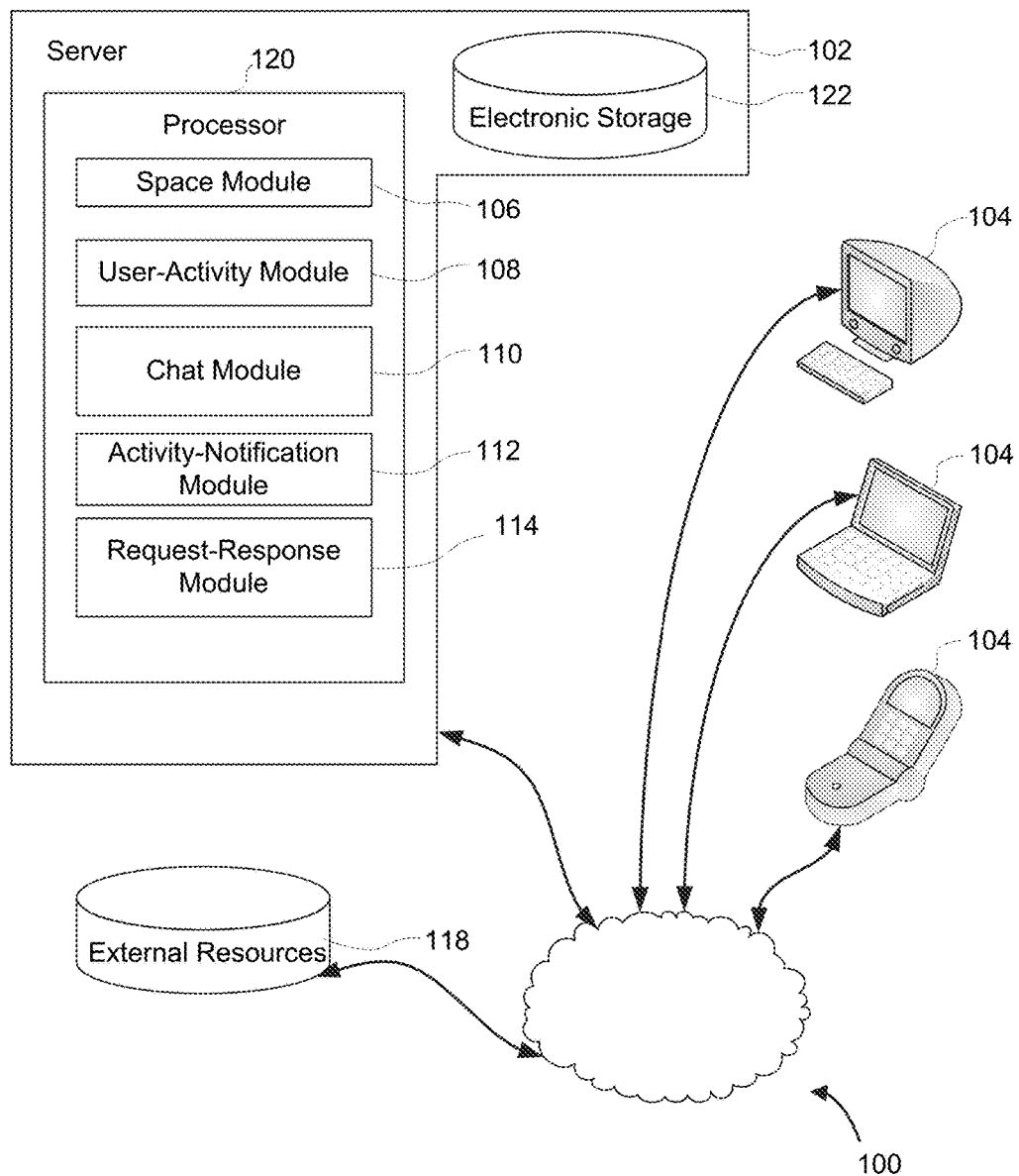
FIG. 1 illustrates one example of a system configured to facilitate user interactions with a virtual space through a graphical chat interface.

FIG. 1 illustrates one example of a system configured to facilitate user interactions with a virtual space through a graphical chat interface. One or more potential inputs and/or virtual space status information to facilitate user interactions with the virtual space may be determined for a user who is participating in a chat session through a graphical chat interface. An activity notification may be generated notifying the user that potential inputs may be provided by the user to progress in the virtual space. Simultaneously or alternatively, the activity notification may be generated to indicate the virtual space status information determined for the user.

The activity notification may comprise graphical representation and controls for presentation through the graphic chat interface to the user. Based on user acceptance to the activity notification through the graphical chat interface, one or more activity commands may be generated and executed in the virtual space. As so facilitated, the user does not have to leave the graphical chat interface in order to interact with the virtual space. This may enhance user experience with the virtual space as the user may expeditiously and conveniently interact with the virtual space while engaging social interactions through the graphical chat interface. Further, this may also improve monetization and/or user retention opportunities for the provider of the virtual space as the users are enabled to consume virtual resources and/or items through the graphical chat interface.

In some implementations, system 100 may include a server 102. The server 102 may be configured to communicate with one or more client computing platforms 104 according to a client/server architecture. The users may access system 100 and/or the virtual space via client computing platforms 104. Server 102 may be configured to execute one or more computer program modules. The one or more computer program modules may include one or more of a space module 106, a user-activity module 108, a chat module 110, an activity-notification module 112, a response-request module 114, and/or other modules.

Space module 106 may be configured to implement the instance of the virtual space executed by the computer modules. The instance of the virtual space may reflect the state of the virtual space. The instance of the virtual space may be used to push state information to clients for implementation on the clients, may be used to verify state information generated on clients executing expressions of the instance locally, and/or for other purposes. State information may include information about the state of the virtual space such as, without limitation, position information of one or more objects, topography information, object status/shape information, battle information, score information, user or character progress information, user inventory information, progress information for one or more activities or actions, view information describing a view of the virtual space, and/or other information that describes the state of the virtual space. Expressions of the instance executed on the clients facilitate presentation of views on the clients of the virtual space. Expressions of the instance executed on the clients may be configured to simply present views of the virtual space based on the state information (e.g., via streaming view information, object/position information, and/or other state information) received from space module 106. Expressions of the instance executed on the clients may include space logic that effectively provides for execution of a limited version of the instance on a client that is synchronized and/or verified with state information received from space module 106. The view presented on a given client may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 104) that present the views of the virtual space to a user through a space interface implemented on client computing platform associated with the user. The space interface may be generated based on view information determined by the space module 106. The space interface may provide one or more virtual space controls to facilitate user actions in the virtual space by the user. The facilitated actions may include user engagement in a combat and/or defense, virtual space maneuvers, inventory management, city management, construction of infrastructure, mining activities, virtual recourses and/or items trading or purchasing, transferring virtual resources, items and/or entities, picking up virtual space resources, and/or any other actions in the virtual space.

In any case, the simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the views of the virtual space determined from the instance executed by space module 106 is not intended to be limiting. The virtual space may be presented in a more limited, or richer, manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other representations of individual places within the virtual space are contemplated.

Within the instance of the virtual space executed by space module 106, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user, with which it is associated. The user controlled element(s) may move through and interact with the virtual space (e.g., non-user characters in the virtual space, other objects in the virtual space). The user may initiate maneuvers to direct the movements of controlled character in the virtual space. The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

Within the instance of the virtual space executed by space module 106, virtual space activities may be provided for users to interact with the virtual space. Examples of virtual space activities may include constructing, upgrading, demolishing buildings, training, marching, reinforcing, reassigning, recruiting, arranging formations, and/or transporting troops, attacking, developing, managing, demolishing and/or defending cities, realms, kingdoms, and/or any other virtual space location entities, crafting or transporting virtual items, attacking, and/or interacting with non-player characters (NPCs herein-after) and/or other user characters, researching for skills levels, experiences, mining and/or prospecting for virtual resources, participating in missions, quests, and/or campaigns, and/or any other activities provided by the virtual space. Some virtual space activities may engage the users against an environment within the virtual space—i.e., PvE activities. In some examples, the virtual space activities may engage the users to compete against one another within the virtual space—i.e., PvP activities.

The user may participate in the instance of the virtual space by taking actions in the virtual space. In some implementations, the user actions may be enabled by physical controls provided by the client computing platforms client computing platform 104 through, such as but not limited to, play buttons, joysticks, motion sensors, cameras, keyboards, mouse, and/or any other control device provided by or coupled to client computing platforms 104. In some implementations, the actions may be enabled by controls provided by graphical user interface (GUI) implemented on client computing platforms 104, such as but not limited to, graphics, menus, dialog boxes, forms, sliding bars, buttons, radio box, tabs, and/or any other controls provided by the GUI. In any case, as so enabled, the user may provide inputs to direct virtual space maneuvers, to participate in virtual activities and/or engage in other interactions within the virtual space. For example, a user may provide an input specifying an amount of troops to be marched to a virtual space location to defend that virtual space location. Commands may be generated for the user action and may be executed by the space module 106 in the virtual space such that the user interactions with the virtual space may be effectuated in the virtual space following the execution. Execution of such a command by the space module 106 may produce changes to the virtual space state, which may reflect progresses and/or results of the user initiated actions. In some examples, state changes caused by user actions may be recorded in the electronic storage 122 to facilitate persistency throughout the instance of the virtual space.

Within the instance of the virtual space executed by space module 106, resources may be, for example, generated, cultivated, mined, harvested, purchased, earned, traded and/or gifted over time by units, characters, pets, buildings, facilities and/or any other infrastructure or entity in the virtual space for the user. Resources may be prospected. Resources may be virtual items of value that can be accumulated through participation in the virtual space, rather than virtual items that can only be bought. Resources may be virtual items that are accumulated en masse and then used to satisfy resource requirements in the virtual space. By way of non-limiting examples, virtual space resources may include food (e.g., rice, fish, wheat, etc.), wood, minerals (e.g., good, iron, ore, coal, oil, stone, crystal, etc.), plants, animals, virtual items, virtual currencies, and/or any other resources appropriate for the virtual space. Transfer of resources between users may be reflected through user inventories such that the transferor user's inventory reduces an amount of the transferred resources that are added to the transferee user.

Some virtual space activities may require consumption of virtual resources. During the virtual space activities, an amount of the resources may be increased or decreased in the user inventory to reflect a consumption (including exhaustion) or procurement of the resources due to the virtual space activities. Some virtual space activities may be associated with time requirements for completion. Length of such time requirements may vary based on various factors specific to the virtual space activities. For example, constructing a level 1 wall in the virtual space may require 30 minutes build time; constructing a level 2 wall may require 1 hour build time; constructing a level 3 wall may require 2 hour build time; constructing a level 4 wall may require 3 hour build time; and so on. The required time for an activity may be shortened by user consumption of virtual items and/or resources. For example, hourglasses may be consumed by users to shorten time requirements for an building, training, research and/or any other durational activity within the virtual space.

Within the instance of the virtual space executed by the space module 106, one or more events may occur. The occurrences of the events typically involve state changes perceivable to users within the virtual space. In some examples, such state changes may be results of user actions within the virtual space. For example, topology, position, character, and/or any other state changes may be caused by a user action of laying roads on a tile within the virtual space. In another example, a user action of marching troops to a virtual space location may produce an event of the troops getting lost on the way.

However, not all events within the virtual space are necessarily caused by user actions. Some events may be created dynamically during runtime of system 100 or pre-determined at a configuration stage of system 100 by a provider, administrator, moderator, and/or any other entities related to the virtual space. For example, an earthquake may occur within the virtual space at a frequency or randomly as determined by the provider, administrator, moderator, and/or any other entities related to the virtual space; sun may rise and set at specific times within the virtual space; and so on.

In some examples, occurrences of events within the virtual space may produce impacts to one or more virtual space locations and/or user characters that may require user actions. For example, an event of a monster movement caused by one user's action, e.g., hunting the monster, may produce an impact to another user's character that is in the path of the monster's movement. As a result, the impacted user may need to direct the user character to move out of the way, and/or to attack the monster. In another example, a NPC intruder may be programmed by the provider, administrator, moderator, and/or any other entities related to the virtual space to attack a city controlled by a user randomly. Responsive to occurrence of such a programmed event, the user may need to take action to defend the city, e.g., by transporting troops to the city.

User-activity module 108 may be configured to identify potential inputs to the space module for users who are participating in chat sessions through graphical chat interfaces. In some implementations, the user-activity module 108 may be configured to determine one or more users are participating in chat sessions through the graphical chat interfaces. Such determinations may be done by querying user activities at a frequency or a sampling rate predetermined by provider, administrator, moderator, and/or any other entities related to the virtual space at a configuration stage of the system 100. Simultaneously and alternatively, such determinations may be made dynamically according to triggers, conditions, and/or any other programming rules determined by the provider, administrator, moderator, and/or any other entities related to the virtual space.

In any case, for those users determined to be participating in the chat sessions through the graphical chat interfaces, user-activity module 108 may dynamically identify potential inputs for users to respond to occurrences of events within the virtual space, to continue activities within the virtual space, to progress in the virtual space, and/or to engage in any other user interactions with the virtual space. Such dynamically identified user inputs may include inputs for the users to consume virtual resources and/or items, initiate virtual space maneuvers, transfer virtual recourses, items or entities, manage virtual space locations (e.g., a city, realm, kingdom, region, state, province, planet, and or any other virtual space locations) controlled by the users, participate in a quest, mission, campaign within the virtual space, collect virtual resources, items, train virtual space entities and/or user characters, research for skills, experiences, craft, purchase, sell and/or trade virtual items, and/or to engage in with any other user interactions with the virtual space. The identified potential user inputs may vary depending on the corresponding user interactions. For example, for the user to complete upgrading a knight's hall, the user-activity module 108 may identify for the user potential inputs that will initiate user consumption of an hourglass to instantly complete the upgrade of knight's hall within the virtual space. In another example, in a case where a user's city is under attack by another user and/or NPC intruder, the user-activity module 108 may identify potential inputs for the user to initiate transportation of troops to the city.

In some implementations, the identified potential inputs by the user-activity module 108 may include inputs for the users to continue activities already under way in the virtual space. In some examples, user consumption of virtual resources may be required in order for the users to continue the activities. For example, a user may have started an upgrade of a knight's hall in the virtual space; the upgrade may consume certain virtual resources, e.g., stones, at a predetermined rate during the time of the upgrade; and during that time, stones may be depleted in the user inventory due to some other activities engaged by the user within the virtual space. In that example, the user-activity module 108 may identify that the user may need to specify an amount of stones to be purchased from a virtual store in order for the user to continue the upgrading of the knight's hall.

In some examples, occurrences of events within the virtual space may produce impacts to the users participating in the chat session through graphical chat interfaces. In those examples, the user-activity module 108 may be configured to identify potential user inputs for the user to respond to those events. For example, in the case where the user is engaging in a mining activity at virtual space location that is being attacked by an NPC intruder, the user-activity module 108 may identify that the user may specify a type and an amount of troops to be transported to that virtual space location for defense. In some other examples, the event may not necessarily produce any impact to any virtual space activity engaged by the user, but produce impact to virtual space location, items, elements, and/or any other virtual space entities controlled by the user. In those examples, the user-activity module 108 may identify potential inputs for users to adapt to the occurrences of those events. For example, responsive to an earthquake that has occurred in an area where the user's city is located within the virtual space, the user-activity module may identify potential inputs for the user, who otherwise may not be aware of such an event while chatting with other users through the graphical chat interface, to manage the city, e.g., reduce taxes, assign entertainers to the city, build more hospitals, etc., so the user may adapt the city to the aftermath of the earthquake through the graphical chat interface.

In some implementations, for those users determined to be participating in the chat sessions through the graphical chat interfaces, the user-activity module 108 may be configured to determine virtual space status information related to the users. The status information may include information indicating status of the activities engaged by the users in the virtual space. Example of such information may include, but not limited to, progress of the activity (e.g., a percentage representation), time left for the activity to complete, virtual resources that have been and/or will be consumed during the activity, events that have occurred within the activity or in relation to the activity, various statistics about the activity and/or the virtual space in general (e.g., troops killed, crops produced, virtual resources collected, manna spent, and/or any other statistics related to the virtual space), and/or any other status information.

In some examples, the determined status information by the user-activity module 108 may include information regarding opportunities and/or motivations provided by the virtual space, which the users otherwise may not be aware of while chatting with other users through the graphical chat interface otherwise. For example, as the virtual place progresses, opportunities may become available for those users to participate in quests, missions, campaigns, tournaments, and/or any other activities within the virtual space. In another example, virtual space objectives may be available for the user dynamically as the user progresses in the virtual space, such as, but not limited to, to attack a NPC controlled virtual space location attackable only by users with certain experience levels, to explore newly created virtual space locations, to hunt for monsters that have been introduced to the virtual space, to pick up virtual items that have been dropped, to observe an epic battle engaged in by two influential users in the virtual space, to research a new technology, and/or any other virtual space objectives.

In some implementations, the user-activity module 108 may determine such status information for those users determined to be participating in the chat sessions through the graphical chat interfaces responsive to occurrence of one or more events within the virtual space. For example, an occurrence of an event may produce an impact to an activity undertaking by one or more of the users, and the user-activity module 108 may determine status information regarding that activity responsive to the occurrence of the event. Simultaneously or alternatively, the user-activity module 108 may determine such status information at a frequency predetermined by the provider of the virtual space: e.g., every 5 minutes, 10 minutes, 30 minutes, 1 hour, and so on.

Chat module 110 may be configured to implement chat sessions to facilitate textual communications between users. The textual communications may include one or more of textual chat, instant messages, private messages, and/or other communications. The textual communications may facilitate the users to share information about the virtual space, engage in social interactions, recruit other users, invite other users to cooperate in the virtual space and/or engage in any other activities enabled the textual communication. The textual communications may be received and entered by the users via their respective client computing platforms 104 and may be routed to and from the appropriate users through server 102 via a chat session implemented by the chat module 110. A chat session may include complete textual communication inputs from users who have participated in the chat session. The textual communication inputs in a chat session may be stored on and accessed from the electronic storage 122. In some examples, a chat session may be open ended within the virtual space such that it does not finish until a provider, administrator, moderator, and/or any other entities related to the virtual space decide not to provide the chat session through the chat module 110. In some other examples, a chat session may be initiated and stopped by users at any time as desired.

In some implementations, chat sessions may be implemented by the chat module based on user relationships. A global chat session may be implemented such that communication inputs from users may be received by any other users who participate in the global chat session. Typically, no specific virtual space relationships may be required for users to participate in the global chat session. Such a global chat session may be open ended and users may join or leave the global chat session at any time as desired. An alliance chat session may be implemented differently from the global chat session in that only alliance members may participate in the alliance chat session. Typically, individual alliance chat sessions are implemented by the chat module for corresponding alliances in the virtual space. Like the global chat session, an alliance chat sessions may allow alliance members to join or leave the alliance chat session at any time and may be open ended. A private chat session may be implemented by the chat module 110 to facilitate user controlled communication between or among individual users. For example, a user may initiate a private chat session to communicate with one or more other users. Unlike global or alliance chat sessions, private chat sessions may not be open ended such that the users may initiate and stop the private chat sessions as desired. It is understood that the above examples of different types of chat sessions are described only for illustration purposes, and thus are not intended to be limiting. One of ordinary skill in the art will appreciate the chat module 110 may implement chat sessions in any other ways to facilitate communication between users in other examples.

In any case, the textual communications between the users in a chat session implemented by the chat module 110 may be either synchronous or asynchronous. In synchronous communication, individual users may receive communication inputs from other users in real-time or near real-time, i.e., without significant delay. In asynchronous communication, time delays may occur between sending communications inputs and receiving the sent communication inputs. In some implementations, the chat module 110 may be configured to mediate asynchronous communication to ensure correct receiving orders.

In some implementations, the textual communications between users facilitated by the chat module 110 may be location based. For example, synchronous communication may be provided by the chat module to users with user characters engaging in activities within an area of virtual space. For instance, users located in a specific realm of virtual space may engage in real-time or near real-time communication with one another. On the other hand, asynchronous communication may be provided to users with user characters located in different areas of virtual space.

In any case, the chat module 110 may be configured to transmit communication inputs in a chat session to client computing platforms 104 associated with users. The communication inputs in the chat session may be presented through a graphical chat interface on the client computing platforms 104. The user may select a full view of the graphical chat interface such that it replaces any view of the space on the client computing platform 104. That is, the graphical chat interface may be presented on the client computing platform 104 exclusively such that the user engaging with the graphical chat interface may not have access to controls provided by a space interface.

The activity-notification module 112 may be configured to generate activity notifications for the users engaging in chat sessions through graphical chat interfaces based on the potential user inputs determined by the user-activity module 108. The generated notification may include graphical representation information that notifies the user of the potential inputs, status information as determined by the user-activity module 108, and/or any other information related to the virtual space. Examples of such graphical representation information may include an image, a graphical art, an animation, and/or any other graphical display of the activity notification. In some implementations, the generated activity notification may include information that facilitates presentation of one or more controls through the graphical chat interface. Such controls may facilitate the user to provide inputs as requested by the activity notification.

Responsive to the generated activity notification, the activity-notification module 112 may be configured to effectuate a communication of the generated activity notifications. In some implementations, the activity-notification module 112 may be configured to determine one or more chat sessions being participated by the user for whom the activity notification(s) is generated. Based on such a determination, the activity-notification module 112 may be configured to address the activity notification to the determined chat session(s) and initiate communication of the activity notification to the user through the determined chat session (s) via the chat module 110.

The response-request module 114 may be configured to receive user acceptance to the activity notification through the graphical chat interface and to generate activity commands to effectuate the user actions initiated through the acceptance in the virtual space. A received user acceptance may specify that a user has specified inputs requested by an activity notification through the graphical chat interface implemented on a client computing platform 104 associated with the user. By way of non-limiting examples, the received user acceptance may include an amount of virtual resources, items and/or any other virtual space entities to be consumed, virtual space maneuvers, city managements, researching, training, mining, troop transportation, resource collecting, attacking, defending and/or any other user inputs that may initiate user actions within the virtual space in response to the activity notification.

In some implementations, the response-request module 114 may receive the acceptance to activity notifications from the chat module 110. For example, a responding user may send the acceptance through a chat session by providing inputs requested by the activity notifications through the graphical chat interface. Such an acceptance may be received and recognized by the chat module 110, which may be configured to push the acceptance to the response-request module 112 for further action. However, this is not necessarily the only case. In another example, the acceptance may be transmitted to the response-request module 112 directly from a client platform 104 associated with the responding user. In that example, response-request module 114 may be configured to interact with a network module of system 100 to receive the acceptance directly from the user without, for example, examining the chat session.

In any case, responsive to receiving user acceptance to the activity notifications, the response-request module 114 may be configured to generate one or more activity commands to effectuate user actions provided through the acceptance. To generate the activity commands, the response-request module 114 may be configured to parse the received acceptance to extract action parameters as provided by the responding user. Syntax for acceptance to activity request may be determined by the provider, administrator, moderator, and/or any other entities related to the virtual space at a configuration stage of system 100 and may be used for parsing such acceptances.

Based on the determined action parameters, the response-request module 114 may generate one or more activity commands executable by the space module 106 to effectuate the user action(s) provided through the acceptance in the virtual space. For example, in the case where a user acceptance specifies that it accepts a request to purchase 1000 stones user's upgrading of a knight's hall, the response-request module 114 may generate an activity command(s) to purchase the 1000 stones from a virtual store provided by the virtual space, to charge the user account for the purchase, and to add the 1000 stones to the user inventory.

The server 102, client computing platforms 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 120 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 118, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 118 may include sources of information, hosts and/or providers of virtual environments outside of system 118, external entities participating with system 100, and/or other resources. In some implementations, some or all of the functionality attributed herein to external resources 118 may be provided by resources included in system 100.

Server 102 may include electronic storage 122, one or more processors 120, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 122 may comprise non-transitory storage media that electronically stores information. The electronic storage media of electronic storage 122 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 116 may include one or more virtual storage resources (e.g., cloud storage, a virtual private network, and/or other virtual storage resources). Electronic storage 122 may store software algorithms, information determined by processor 120, information received from server 102, information received from client computing platforms 104, and/or other information that enables server 102 to function as described herein.

Processor(s) 120 is configured to provide information processing capabilities in server 102. As such, processor 120 may include one or more of a digital processor, an analog processor, a digital circuit designed to process information, an analog circuit designed to process information, a state machine, and/or other mechanisms for electronically processing information. Although processor 120 is shown in FIG. 1 as a single entity, this is for illustrative purposes only. In some implementations, processor 120 may include a plurality of processing units. These processing units may be physically located within the same device, or processor 120 may represent processing functionality of a plurality of devices operating in coordination. The processor 120 may be configured to execute modules 106, 108, 110, 112, 114 and/or other modules. Processor 120 may be configured to execute modules 106, 108, 110, 112, 114 and/or other modules by software; hardware; firmware; some combination of software, hardware, and/or firmware; and/or other mechanisms for configuring processing capabilities on processor 120. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 106, 108, 110, 112, 114 are illustrated in FIG. 1 as being implemented within a single processing unit, in implementations in which processor 122 includes multiple processing units, one or more of modules 106, 108, 110, 112, 114 may be implemented remotely from the other modules. The description of the functionality provided by the different modules 106, 106, 108, 110, 112, 114 described below is for illustrative purposes, and is not intended to be limiting, as any of modules 106, 108, 110, 112, 114 may provide more or less functionality than is described. For example, one or more of modules 106, 108, 110, 112, 114 may be eliminated, and some or all of its functionality may be provided by other ones of modules 106, 108, 110, 112, 114. As another example, processor 120 may be configured to execute one or more additional modules that may perform some or all of the functionality attributed below to one of modules 106, 108, 110, 112, 114.

It is understood that the above description of system 100 is merely illustrated as one example of a system configured to facilitate user interactions with a virtual space through a graphical chat interface. It should be appreciated that in some examples, a localized system 100 may be configured according to a stand-alone architecture such that the system configured to provide rewards to a user in a virtual space based on user performance of gesture in accordance with the disclosure may be localized. For example, the localized system 100 may comprise a processor the same as or similar to the processor 120, e.g., a CPU, a graphical processing unit (GPU), storage, memory, an I/O subsystem, and/or other components included the localized system 100. In those examples, the CPU may be configured to communicate virtual space state information to the GPU through any suitable wired or wireless communications such as, but not limited to, a point-to-point communication like a data bus included in the localized system 100. The GPU may be configured to determine representational view information for presenting instances of virtual space on one or more displays coupled to or included in the localized system 100. It should also be appreciated in some other examples, multiple localized systems 100 may be connected via any wired or wireless links according to a distributed architecture (e.g., peer to peer networks) such that the localized systems 100 may be configured to operate in concert to achieve all or some of the functions of 106, 108, 110, 112, 114, as described above.

FIG. 2A illustrates one example of facilitating user interactions with a virtual space through a graphical chat interface 200 in accordance with the disclosure. It will be described with references to FIG. 1. As illustrated, the graphical chat interface 200 may comprise tabs for chat sessions 202. In this example, the graphical chat interface 200 is generated for user 1 on a client computing platform 104 (not shown in this example for clarity of illustration) associated with user 1. In this example, two chat sessions are available through the graphical chat interface 200—a global chat session and an alliance chat session. As also shown, in this example, two users, user 1 and user 2, are engaging in textual communications 210 through a global chat session 202. Their textual communications 210 may be input to the global chat session 202 through a text box 204 and a chat button 206 included in the graphical chat interface 200, as shown. The graphical chat interface 200 also comprises a scroll bar 208 to facilitate the textual communications 210 between user 1 and user 2. As shown in this example, the user 1, status information about an upgrade of a knight's hall in the virtual space is presented in the chat interface 200 through graphical representation 210 based on activity notification 220 generated by the server 102. As described above, in some implementations, the activity notification 220 may be generated by activity-notification module 112. As shown, the activity notification 220 may comprise graphical representation information of the knight's hall. In this example, the activity notification 220 is presented in the graphical interface at 6:20 pm and 6:29 to notify user 1 about respective upgrade progresses as illustrated. In this example, also shown is a control 214 facilitating the user to speed up the upgrade of knight's hall based on corresponding information included in the activity notification 220. The control 214 in this example provides an opportunity for the user to shorten the upgrade time required for the knight's hall. As also shown, at 6:29 pm, user 1 decides to speed up the upgrade by clicking on the speed-up control 214.

FIG. 2B illustrates an example of facilitating a user to consume virtual items through a graphical chat interface 200 in accordance with the disclosure. In this example, the graphical chat interface 200 is generated for user 1 on a client computing platform 104 (not shown in this example for clarity of illustration) associated with user 1. In this example, as shown, responsive to user 1's inputs to speed up the upgrade of the knight's hall through the speed-up control 214, controls 214 that facilitate the user to select an hourglass for consumption so the speedup of the upgrade may be achieved. As shown in this example, the hourglass controls 214 may be generated in the graphical chat interface 200 based on corresponding graphical representation information included in the activity notification 220. As illustrated, the hourglass controls 214 provide options available for user 1 to consume different hourglasses owned by user 1 or purchase an available hourglass from a virtual store (i.e., the "get more" option). As shown, in this example, user 1 selects to consume Guinevere's hourglass.

Figure 2C:
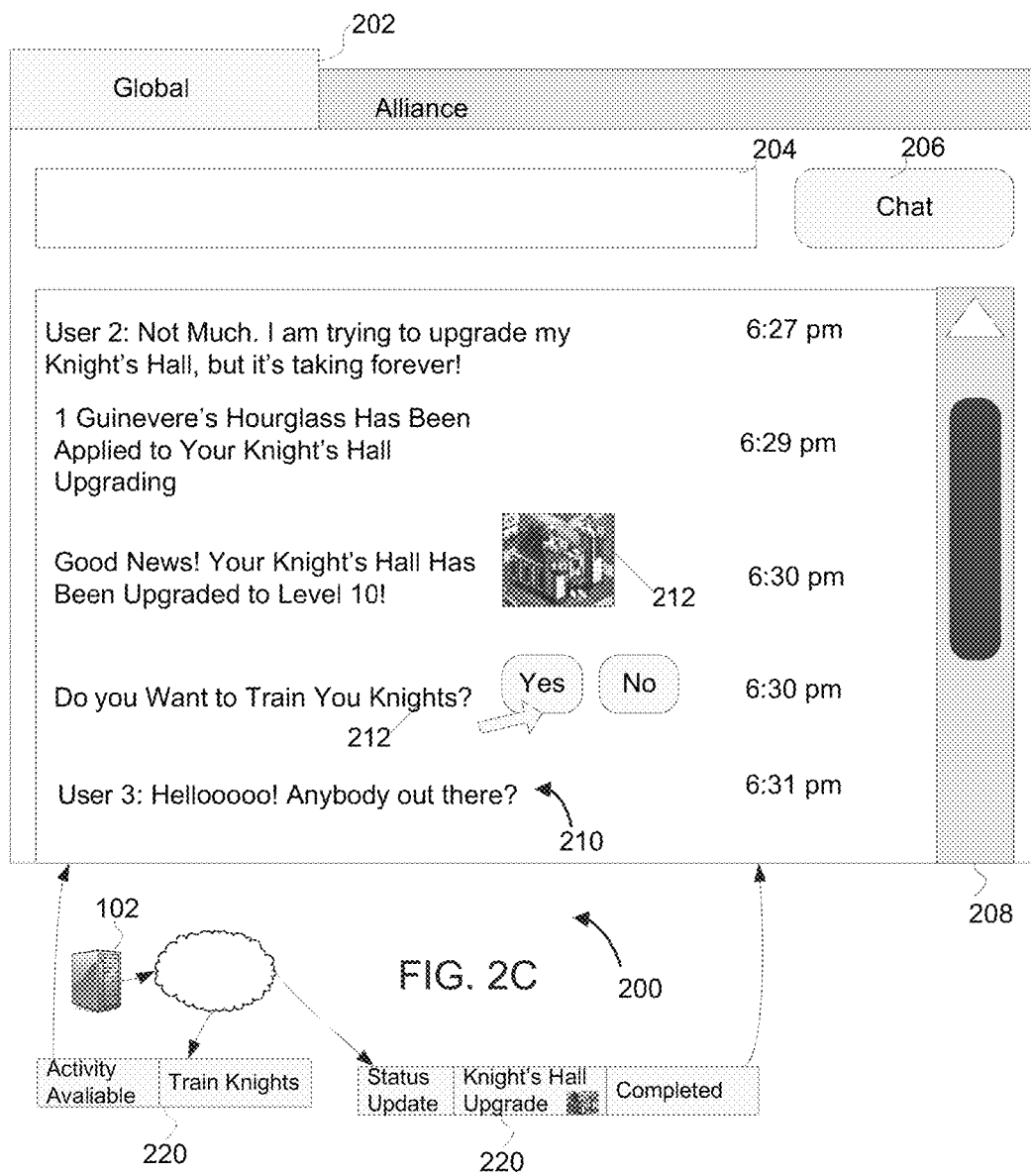
FIG. 2C illustrates an example of facilitating a user to interact with the virtual space by identifying potential inputs for the user to initiate an action within the virtual space.

FIG. 2C illustrates an example of facilitating a user to interact with the virtual space by identifying potential inputs for the user to initiate an action within the virtual space. In this example, the graphical chat interface 200 is generated for user 1 on a client computing platform 104 (not shown in this example for clarity of illustration) associated with user 1. As shown in this example, graphical representation 212 of status information indicating that the knight's hall upgrade has completed within the virtual space is presented in the graphical chat interface 200. As illustrated, the graphical representation 212 may be presented based on an activity notification 220 generated by the sever 102. Also shown in this example is potential inputs for the user to train knights in the newly upgraded knight's hall is determined and an activity notification 220 indicating such is generated. Responsive to such an activity notification 220, the graphical chat interface 200 may generate a control 212 for user 1 to specify whether to train the knights, as illustrated. As shown, user 1 has accepted the knight training opportunity provided by the activity notification 220.

FIG. 2D illustrates another example of facilitating a user to interact with a virtual space through a graphical chat interface. In this example, the graphical chat interface 200 is generated for user 1 on a client computing platform 104 (not shown in this example for clarity of illustration) associated with user 1. As shown, in this example, an activity notification 220 may be generated by the sever 102 to notify the user that various characteristics about user 1's knights may be increased. As shown, a control 214 to facilitate user inputs to specify an amount of experience points of the knight may be provided in the graphical chat interface 200.

Figure 3:
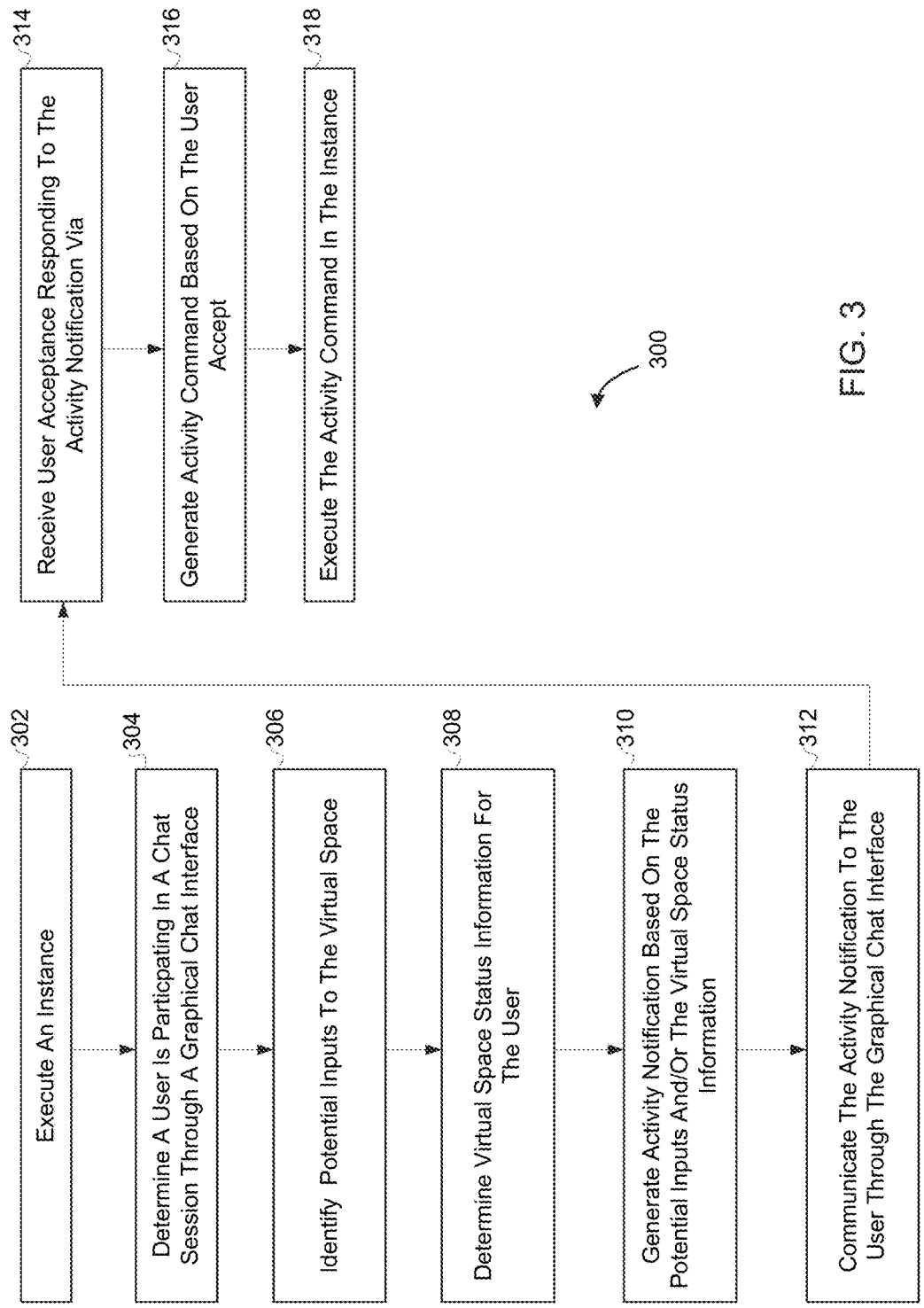
FIG. 3 illustrates an exemplary method 300 for facilitating user interactions with the virtual space through a graphical chat interface.

FIG. 3 illustrates an exemplary method 300 for facilitating user interactions with the virtual space through a graphical chat interface. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At operation 302, an instance of a virtual space may be executed and implemented to determine view information for transmission to one or more client computing platforms associated with users. The users may participate in the virtual space by controlling entities therein. In some implementations, operation 302 may be performed by a space module the same as or similar to space module 106 (shown in FIG. 1 and described herein).

At operation 304, a determination that a user is participating in a chat session through a graphical chat interface is made. In some implementations, operation 304 may be performed by user-activity module the same as or similar to user-activity module 108 (shown in FIG. 1 and described herein).

At operation 306, potential inputs to the virtual space may be identified for the user determined in operation 304. The potential inputs may be identified to further user progress in the virtual space and/or to continue virtual space activities engaged by the user. In some examples, the identified potential inputs may include user specifications for an amount and/or type of virtual resources, items, and/or any other virtual space elements to be consumed in the virtual space. In some implementations, operation 306 may be performed by user-activity module the same as or similar to user-activity module 108 (shown in FIG. 1 and described herein).

At operation 308, virtual space status information may be determined for the user determined in operation 304. The status information may include information regarding progress of a virtual space activity(s) engaged by the user in the virtual space, events in the virtual space, statistics about the activity and/or the virtual space in general, and/or any other status information. In some implementations, operation 308 may be performed by user-activity module the same as or similar to user-activity module 108 (shown in FIG. 1 and described herein).

At operation 310, an activity notification may be generated for the user based on the potential inputs identified in operation 306 and/or status information determined in operation 308. The activity notification may comprise graphical representation of the notification and as well as representation information about one or more controls for facilitating the user to specify inputs requested by the notification through the graphical chat interface. In some implementations, operation 310 may be performed by activity-notification module the same as or similar to activity-notification module 112 (shown in FIG. 1 and described herein).

At operation 312, the activity notification generated in operation 312 may be communicated to the user through the graphical chat interface. In some implementations, operation 312 may be performed by chat module the same as or similar to chat module 110 (shown in FIG. 1 and described herein).

At operation 314, user acceptance responding to the activity notification via the graphical chat interface may be received. In some implementations, operation 314 may be performed by request-response module the same as or similar to request-response module 114 (shown in FIG. 1 and described herein).

At operation 316, one or more activity commands may be generated based on the user acceptance received in operation 316. In some implementations, operation 316 may be performed by request-response module the same as or similar to request-response module 114 (shown in FIG. 1 and described herein).

At operation 318, the activity command (s) generated in operation 318 may be executed in the virtual space. In some implementations, operation 318 may be performed by a space module the same as or similar to space module 106 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate user interactions with a virtual space through a graphical chat interface, the system comprising:
   one or more processors configured by machine-readable instructions to:
      execute an instance of the virtual space, to implement the instance of the virtual space by receiving and executing commands to facilitate user interactions with the virtual space, and to determine view information for presentation of the virtual space on client computing platforms through space interfaces to facilitate user actions in the virtual space;
      implement an instance of a chat session to facilitate synchronous textual communications between users within the virtual space, and transmit the textual communications that make up the chat session to the computing platforms for presentation through graphical chat interfaces, the graphical chat interfaces being presented on the client computing platforms such that they replace the space interfaces to facilitate the presentation of the textual communications;
      identify potential inputs for users participating in the chat session through the graphical chat interfaces;
      generate activity notifications such that responsive to identification of a first potential input for a first user and also responsive to the first user participating in the chat session through the graphical chat interface, a first activity notification is generated for the first user for presentation to the first user through a graphical chat interface implemented on a client computing platform associated with the first user
      receive user acceptances to activity notifications submitted by users through the graphical chat interfaces and to generate commands executable by the one or more processors, wherein responsive to receiving an acceptance to the first activity notification from the first user, a first activity command executable by the one or more processors is generated; and,
      wherein responsive to the generation of the first activity command, the first activity command is executed.

2. The system of claim 1, wherein the one or more processors are configured by machine-readable instructions such that the first activity notification comprises graphical representation information for presenting the first activity notification through the graphical chat interface implemented on the client computing platform associated with the first user.

3. The system of claim 2, wherein the first activity notification is related to marching, researching, crafting, building, transporting, mining, prospecting or training within the virtual space.

4. The system of claim 3, wherein the one or more processors are configured by machine-readable instructions such that the first activity notification is generated to request the first user to consume virtual resources and/or virtual items within the virtual space.

5. The system of claim 1, wherein the one or more processors are further configured by machine-readable instructions to determine virtual space status information for the first user, such that the first activity notification is generated responsive to the determined virtual space status information for the first user.

6. The system of claim 5, wherein the one or more processors are configured by machine-readable instructions such that the status information is generated for the first user responsive to occurrence of an event related to the first user within the instance of the virtual space.

7. The system of claim 6, wherein the one or more processors are configured by machine-readable instructions such that the status information is generated for the first user at a predetermined frequency.

8. The system of claim 1, wherein the one or more processors are further configured by machine-readable instructions such that the first activity notification comprises representation information for presenting one or more controls that facilitate consumption of the virtual resources for the first user through the graphical chat interface implemented on the client computing platform associated with the first user.

9. The system of claim 1, wherein the one or more processors are further configured by machine-readable instructions such that:
   responsive to identification of a second potential input for a second user and also responsive to the second user participating in the chat session through the graphical chat interface, a second activity notification is generated for the second user for presentation to the second user through a graphical chat interface implemented on a client computing platform associated with the second user;
   responsive to receiving an acceptance to the second activity notification from the second user, a second activity command executable by the one or more processors is generated; and,
   wherein responsive to the generation of the second activity command, the one or more processors execute the second activity command.

10. A method for facilitating user interactions with a virtual space, the method being implemented in one or more physical processors configured by machine-readable instructions, the method comprising:
   executing an instance of the virtual space;
   implementing the instance of the virtual space by receiving and executing commands to facilitate user interactions with the virtual space, and determining view information for presentation of the virtual space on client computing platforms through space interfaces to facilitate user actions in the virtual space;
   implementing an instance of a chat session to facilitate synchronous textual communications between users within the virtual space;
   transmitting the textual communications that make up the chat session to the computing platforms for presentation through graphical chat interfaces, the graphical chat interfaces being presented on the client computing platforms such that they replace the space interfaces to facilitate the presentation of the textual communications;
   identifying potential inputs to the virtual space for users participating in the chat session through the graphical chat interfaces;

generating activity notifications such that responsive to identification of a first potential input for a first user and also responsive to the first user participating in the chat session through the graphical chat interface, generating a first activity notification for the first user for presentation to the first user through a graphical chat interface implemented on a client computing platform associated with the first user;

receiving user acceptances to activity notifications submitted by users through the graphical chat interfaces and generating commands executable by the one or more processors, wherein responsive to receiving an acceptance to the first activity notification from the first user, generating a first activity command executable by the one or more processors;

responsive to the generation of the first activity command, executing the first activity command.

11. The method of claim 10, wherein the first activity notification is generated such that the first activity notification comprises graphical representation information for presenting the first activity notification through the graphical chat interface implemented on the client computing platform associated with the first user.

12. The method of claim 11, wherein the first activity notification is related to marching, researching, crafting, building, transporting, mining, prospecting or training within the virtual space.

13. The method of claim 12, wherein the first activity notification is generated to request the first user to consume virtual resources and/or virtual items within the virtual space.

14. The method of claim 10, further comprising determining virtual space status information for the first user, wherein the first activity notification is generated responsive to the determined status information for the first user.

15. The method of claim 14, wherein the status information is generated for the first user responsive to occurrence of an event related to the first user within the instance of the virtual space.

16. The method of claim 15, wherein the status information is generated for the first user at a predetermined frequency.

17. The method of claim 10, wherein the first activity notification is generated such that the first activity notification further comprises representation information for presenting one or more controls that facilitate consumption of the virtual resources for the first user through the graphical chat interface implemented on the client computing platform associated with the first user.

18. The method of claim 10, further comprising responsive to identification of a second potential input for a second user and also responsive to the second user participating in the chat session through the graphical chat interface, generating a second activity notification for the second user for presentation to the second user through a graphical chat interface implemented on a client computing platform associated with the second user;

responsive to receiving an acceptance to the second activity notification from the second user, generating a second activity command executable by the one or more processors; and responsive to the generation of the second activity, executing the second activity command.

\* \* \* \* \*